US008585085B2

(12) United States Patent  
Kobayashi et al.

(10) Patent No.: US 8,585,085 B2  
(45) Date of Patent: Nov. 19, 2013

(54) GAS GENERATOR

(71) Applicant: Daicel Corporation, Osaka (JP)

(72) Inventors: Tomoharu Kobayashi, Tatsuno (JP); Masayuki Yamazaki, Tatsuno (JP); Shinichiro Ukita, Tatsuno (JP)

(73) Assignee: Daicel Corporation, Osaka (JP)

( * ) Notice: Subject to any disclaimer, the term of this patent is extended or adjusted under 35 U.S.C. 154(b) by 0 days.

(21) Appl. No.: 13/749,537

(22) Filed: Jan. 24, 2013

(65) Prior Publication Data

US 2013/0233196 A1    Sep. 12, 2013

Related U.S. Application Data

(60) Provisional application No. 61/609,810, filed on Mar. 12, 2012.

(30) Foreign Application Priority Data

Mar. 12, 2012  (JP) ................................. 2012-054211

(51) Int. Cl.  
*B60R 21/26*  (2011.01)

(52) U.S. Cl.  
USPC ............................ 280/741; 280/736; 102/530

(58) Field of Classification Search  
USPC .................... 280/736, 741; 102/530  
See application file for complete search history.

(56) References Cited

U.S. PATENT DOCUMENTS

| | | | |
|---|---|---|---|
| 5,503,806 A * | 4/1996 | Fulmer et al. ................. | 422/164 |
| 5,582,427 A | 12/1996 | Rink et al. | |
| 5,613,705 A * | 3/1997 | Hock et al. .................... | 280/741 |
| 6,032,979 A * | 3/2000 | Mossi et al. ................... | 280/741 |
| 6,234,521 B1 | 5/2001 | Katsuda et al. | |
| 6,290,526 B1 * | 9/2001 | Minami et al. ................ | 439/336 |
| 7,267,365 B2 * | 9/2007 | Quioc ............................ | 280/736 |
| 7,806,954 B2 | 10/2010 | Quioc | |
| 7,883,111 B2 * | 2/2011 | Blessing et al. .............. | 280/741 |

(Continued)

FOREIGN PATENT DOCUMENTS

DE    10 2006 039 496 A1    3/2007  
EP         1 689 258 A1         6/2006

(Continued)

OTHER PUBLICATIONS

International Search Report and Written Opinion issued in International Application No. PCT/JP2013/051938 on Apr. 24, 2013.

*Primary Examiner* — Toan To  
(74) *Attorney, Agent, or Firm* — Birch, Stewart, Kolasch & Birch, LLP (57) ABSTRACT

A gas generator includes a diffuser shell and a closure shell, a housing formed by joining the diffuser shell and the closure shell, inside the housing, an ignition device chamber defined by a cup-shaped container, a combustion chamber enclosing the ignition device chamber, an annular or flat plate-shaped filter facing the top plate, a retainer supporting the filter, the retainer including a bottom surface and a cylindrical wall surface extending from an outer circumferential edge of the bottom surface, the cylindrical wall surface having a gas passage, the retainer being fixed by the cylindrical wall against a circumferential wall plate. During actuation, when the housing is deformed the retainer and the filter move to abut the top plate of the diffuser shell, combustion gas passes through the filter and the gas passage to be discharged from the gas discharge port.

7 Claims, 3 Drawing Sheets

(56) References Cited

U.S. PATENT DOCUMENTS

| | | |
|---|---|---|
| 2003/0137138 A1 | 7/2003 | Nakashima et al. |
| 2004/0061319 A1* | 4/2004 | Saso et al. .................... 280/741 |
| 2005/0161924 A1* | 7/2005 | Schoenhuber et al. ....... 280/741 |
| 2005/0200107 A1 | 9/2005 | Matsuda et al. |
| 2006/0088456 A1 | 4/2006 | Hanano et al. |
| 2006/0119087 A1 | 6/2006 | Blessing et al. |
| 2006/0186653 A1* | 8/2006 | Schoenhuber ................ 280/741 |
| 2007/0046005 A1 | 3/2007 | Hanano et al. |
| 2007/0222195 A1 | 9/2007 | Yabuta et al. |
| 2007/0273132 A1* | 11/2007 | Smith et al. ................... 280/736 |

FOREIGN PATENT DOCUMENTS

| | | |
|---|---|---|
| EP | 1 790 539 A1 | 5/2007 |
| EP | 1 837 253 A1 | 9/2007 |
| JP | 7 251696 A | 10/1995 |
| JP | 10-95303 A | 4/1998 |
| JP | 2005-199867 A | 7/2005 |

\* cited by examiner

# GAS GENERATOR

This nonprovisional application claims priority under 35 U.S.C. §119(a) to Patent Application No. 2012-54211 filed in Japan on 12 Mar. 2012 and 35 U.S.C. §119(e) to U.S. Provisional application No. 61/609,810 filed on 12 Mar. 2012, which are incorporated by reference.

BACKGROUND OF INVENTION

1. Field of Invention

The present invention relates to a gas generator suitable for a restraining device, for example, in a vehicle, such as an airbag apparatus.

2. Description of Related Art

In a gas generator suitable for a restraining device such as an airbag apparatus, various parts and a gas generating agent are housed inside a housing forming an outer shell, and it is important to reduce the number of parts and facilitate the assembling process, while maintaining high quality of the gas generator.

In the inflator shown in FIG. 1 of U.S. Pat. No. 5,582,427, a gas generating agent 30 is disposed at the lower side of a gas generating chamber 28 inside a housing, and a filter 34 is disposed at the upper side facing a gas discharge port 40. A housing 12 has a double-tube type formed by an outer tube 16 and an inner tube 18, and a top plate 20 and a bottom plate 14 are connected to the outer tube and inner tube, respectively.

The upper end of the filter is abutted against the top surface of the housing, and a seal 42 is disposed at the lower end to ensure sealing with respect to each gas flow. The seal 42 has an elastic outer circumferential edge (leg 50). In the leg 50, the distal end is press-fitted into a groove formed in a housing wall and a pressing force is applied to the filter towards the top surface, thereby sealing the upper and lower ends of the filter.

In U.S. Pat. No. 5,582,427, the leg 50 is fixed to the groove, as described above, thereby sealing the upper and lower end surfaces of the filter.

In the gas generator shown in FIG. 10 of JP-A No. 10-095303, a filter 307 is disposed close to a gas discharge port 311 of a diffuser shell 301, and a gap 309 is formed.

The inner circumferential surface of the filter 307 is held by a plate member 332, and the lower surface of the filter is held by a plate member 333.

The plate member 333 is press-inserted to the inner circumferential surface of the diffuser shell 301. The lower end of the plate member 333 is abutted against a tilted section 331 of a closure shell 302 and holds the filter 307.

U.S. Pat. No. 7,806,954 discloses a gas generator 10 shown in FIG. 1.

By contrast with the gas generators disclosed in U.S. Pat. No. 5,582,427 and JP-A No. 10-095303, a first housing 22 and a second housing 24 are joined only the respective circumferential walls.

A baffle assembly 12 is disposed inside the housing, and a filter retainer 50 is included. As a result, gas generated by a gas generating agent 38 is guided by a zigzag gas discharge path to an aperture 28. An annular member 55 is welded to a booster tube 30, and the filter retainer 50 is also welded to the annular member 55.

SUMMARY OF INVENTION

The invention 1 provides a gas generator including:
a diffuser shell having a top plate and an upper circumferential wall plate provided with a gas discharge port,
a closure shell having a bottom plate and a lower circumferential wall plate,
a housing forming an outer shell and being obtained by joining and integrating the upper circumferential wall plate and the lower circumferential wall plate,
inside the housing,
an ignition device chamber defined by a cup-shaped container, which is positioned at a central part of the bottom plate of the closure shell, and accommodating an ignition device therein,
a combustion chamber formed to enclose the ignition device chamber and being loaded with a gas generating agent,
an annular or flat plate-shaped filter disposed to face the top plate,
a retainer supporting the filter,
the retainer including a bottom surface and a cylindrical wall surface extending from an outer circumferential edge of the bottom surface at least towards the top plate of the diffuser shell, the cylindrical wall surface having a combustion gas passage,
the retainer supporting at least part of an outer circumferential surface and a lower surface of the filter by the bottom surface and the cylindrical wall surface, respectively,
the retainer being fixed by directly or indirectly press-fitting the cylindrical wall surface to a circumferential wall plate which is formed by the upper circumferential wall plate and the lower circumferential wall plate,
during actuation,
when the housing is deformed in both directions of the top plate of the diffuser shell and the bottom plate of the closure shell, and the retainer and the filter move in attachment to the top plate of the diffuser shell, combustion gas passing through the filter, then passing through the combustion gas passage in the cylindrical wall surface of the retainer and being discharged from the gas discharge port.

The invention 4 provides another gas generator including:
a diffuser shell having a top plate and an upper circumferential wall plate provided with a gas discharge port,
a closure shell having a bottom plate and a lower circumferential wall plate,
a housing forming an outer shell and being obtained by joining and integrating the upper circumferential wall plate and the lower circumferential wall plate and including a circumferential wall plate,
the housing having a step portion formed in the upper circumferential wall plate, an inner diameter of a portion in the upper circumferential wall plate, which is provided with a gas discharge port in the diffuser shell being made less than an inner diameter of the remaining portion of the upper circumferential wall plate by the step portion,
inside the housing,
an ignition device chamber defined by a cup-shaped container, which is positioned at a central part of the bottom plate of the closure shell, and accommodating an ignition device therein
a combustion chamber formed to enclose the ignition device chamber and being loaded with a gas generating agent,
an annular or flat plate-shaped filter disposed to face the top plate,
a retainer supporting the filter,
the retainer including a bottom surface which supports at least part of a lower surface of the filter,
the retainer being fixed at a circumferential edge thereof by press-fitting into an inner circumferential surface of the circumferential wall plate with a gap provided at the step portion, during activation when the housing is deformed in both directions of the top plate of the diffuser shell and the bottom plate of the closure shell, and when movement of the retainer is blocked by the circumferential edge of the retainer abutting against the step portion, the filter being in close contact with the top plate of the diffuser shell, combustion gas passing through the filter and being discharged from the gas discharge port.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 1, in (a), shows a cross-sectional view in the direction of the axis X of a gas generator prior to actuation, in (b), a perspective view illustrating a filter supported by a retainer (a view cut out in part), and, in (c), a state after the actuation of the gas generator shown in (a).

FIG. 2 shows, in (a), a cross-sectional view in the direction of the axis X of a gas generator of another embodiment prior to actuation, and, in (b), a state after the actuation of the gas generator shown in (a).

FIG. 3 shows, in (a) a cross-sectional view in the direction of the axis X of a gas generator of still another embodiment prior to actuation, in (b), a state after the actuation of the gas generator shown in (a), and in (c), a cross-sectional view of the still another embodiment shown in (a).

DETAILED DESCRIPTION OF INVENTION

In U.S. Pat. No. 5,582,427, when the housing is deformed in the vertical direction in the drawing, during actuation, a gap appears between the seal 42 and the filter 34, and short-passing can occur such that the combustion gas is discharged from the gas discharge port 40, without passing through the filter.

Further, it is difficult to adjust the insertion position of the seal 42 on the basis of the loading amount of the gas generating agent and the thickness of the filter.

In JP-A No. 10-095303, when the diffuser shell 301 and the closure shell 302 are deformed in the vertical direction in the drawing, during actuation, a gap appears between the plate member 333 and the filter 307, and a short-passing can occur such that the combustion gas is discharged from a gas discharge port 311, without passing through the filter.

Further, because of a structure in which the lower end of the plate member 333 is abutted against the tilted portion 331, this structure sometimes cannot be adapted to the cases in which the filter thickness need to be changed.

In U.S. Pat. No. 7,806,954, since the welded zone of the housing is only the circumferential wall, the first housing 22 and the second housing 24 are easily deformed in the axial direction during actuation, and in this case a gap is easily formed between the top plate of the first housing 22 and the filter 60.

The present invention provides a gas generator for a restraining device or the like, such that an inner structure and a assembling process are simplified and no short-passing of combustion gas occurs even when the housing is deformed under pressure during actuation.

In the gas generator of invention 1 or 4, when the housing is deformed due to the increase in the internal pressure during actuation, the retainer and the filter held by the retainer are likewise deformed, thereby preventing the combustion gas from short-passing, which is to be discharged from the gas discharge port without passing through the filter.

The bottom surface of the retainer may be provided with a through-hole.

The filter is disposed to face the top plate.

The filter has an annular shape or a flat plate shape.

In a state before the gas generator is actuated, the filter is directly attached to the top plate, or a sheet-shaped gasket or seal member may be interposed therebetween, or faces the top plate through a slight gap.

The filter is preferably formed from an iron or stainless steel material by compression-molding a steel wire wound in a circumferential direction (wound wire type), a perforated steel sheet (expanded metal or punched metal type), or knitted steel wire (knitted mesh type), by laminating a plurality of wire meshes punched in a disk shape, or by winding a wire mesh in a circumferential direction. When the filter is disposed inside the housing, a wire material, a wire diameter, a compression-molding pressure, a density, the number of laminated sheets and a thickness are adjusted to ensure that mainly the central portion of the filter is deformed in the axial direction.

The retainer has a bottom surface having a through-hole and a cylindrical wall surface, and a combustion gas passage is formed during actuation in the cylindrical wall surface. The combustion gas passage can be formed by a through-hole or a cut-out formed in the cylindrical wall surface.

A shape of the bottom surface of the retainer is not particularly limited. Thus, it has a disk-like shape formed with a through-hole having a diameter less than the outer diameter of the cup-shaped container, and the retainer is disposed so that part of the bottom surface abuts against the cup-shaped container at the portion where the through-hole is not formed.

Alternatively, the bottom surface of the retainer has an annular shape formed with a through-hole having a diameter less than the outer diameter of the cup-shaped container, and the retainer is disposed with a distance from the cup-shaped container so that the through-hole faces the closed bottom surface of the cup-shaped container. Or, the bottom surface of the retainer has an annular shape formed with a through-hole having an inner diameter slightly larger than the outer diameter of the cup-shaped container, and the retainer is disposed so that the bottom surface of the retainer is present radially outside the cup-shaped container or above the closed bottom surface thereof.

The cylindrical wall surface extends from the outer circumferential edge of the bottom surface towards the top plate of the diffuser shell, and also extends towards the bottom plate side of the closure shell. The height of the cylindrical wall surface can be such that the upper end section of the filter slightly protrudes from the upper end of the cylindrical wall surface when the filter is disposed on the bottom surface before the gas generator is actuated.

The retainer is fixed, press-fitted, directly or indirectly into the circumferential wall plate, and no fixing means such as welding is used therefor.

When the retainer is indirectly press-fitted into the circumferential wall plate, for example, other member is fixed (preferably fixed by press-fitting) to the circumferential wall plate and then the retainer is fixed by press-fitting into the fixed other member.

The retainer is preferably made from a ductile metal, such as stainless steel, iron, or aluminum. In particular, since the cylindrical wall surface is directly or indirectly press-fitted into the circumferential wall plate, but the retainer moves together with the filter towards the top plate of the diffuser shell during activation of the gas generator, preferably, the dimensions or thickness of the retainer is adjusted so that the press-fitting degree thereof enables the retainer to move under the effect of pressure created during actuation. Further, the thickness of the bottom surface is adjusted so that the filter is brought into intimate contact with the top plate of the diffuser shell by using the ductility of the bottom surface.

The filter is supported by the retainer, but is not fixedly attached to the retainer.

At least portion of the outer circumferential surface and the lower surface of the filter are supported by the cylindrical wall surface and the bottom surface of the retainer, respectively.

A shape of the bottom surface of the retainer is such that the bottom surface is abutted against and supported by the lower surface of the filter. A shape of the cylindrical wall surface of the retainer is such that the cylindrical wall surface can be abutted against and supported by the outer circumferential surface of the filter and also is fixed in a state of being directly or indirectly press-fitted into the circumferential wall plate of the housing.

The housing is integrated by joining at the circumferential edge at the opening of the diffuser shell and the circumferential edge at the opening of the closure shell.

The opening of the cup-shaped container is fixed, for example, by welding to the bottom plate of the closure shell, but the bottom surface of the cup-shaped container is not fixed to the top plate of the diffuser shell. Therefore, when the gas generator is actuated, the degree of axial deformation is the largest at the central portion of the top plate and the central portion of the bottom plate, and the degree of deformation decreases towards the circumferential wall plate.

In this case, since the deformation of the retainer and filter is higher towards to the central portion, a state in which the upper surface of the filter abuts against the top plate of the housing and the lower surface of the filter abuts against the bottom surface of the retainer is maintained. Therefore, short-passing such that the combustion gas is discharged from the gas discharge port, without passing through the filter, is prevented.

Further, since the outer circumferential surface of the filter faces the gas passage including the gas discharge port for discharging the gas generated inside the combustion chamber to the outside, the combustion gas flows radially outward inside the filter and is discharged from the outer circumferential surface of the filter to the outside of the combustion chamber.

When a flat plate-shaped filter is used, the filter is disposed above the cup-shaped container and arranged so that the entire upper surface of the filter is brought, directly or indirectly, into contact with the top plate of the housing. Further, when an annular filter is used, the inner diameter thereof is made larger than the outer diameter of the cup-shaped container and the filter is disposed above or radially outside the cup-shaped container.

The ignition device includes only a known electric igniter, or also includes an explosive such as a known transfer charge or a gas generating agent.

The invention 2, being preferable, provides the gas generator of invention 1, wherein the retainer has a depression and a protrusion in the circumferential direction thereof at a circumferential edge of the cylindrical wall surface in a side of the top plate of the diffuser shell, and when the housing is deformed both in the direction of the top plate and in the direction of the bottom plate and both the retainer and the filter move towards the top plate of the diffuser shell during actuation, the protrusion of the cylindrical wall surface of the retainer is abutted against the top plate of the diffuser shell, and the depression of the cylindrical wall surface of the retainer forms the combustion gas passage.

The depression and protrusion formed in the circumferential edge of the cylindrical wall surface of the retainer in the side of the top plate of the diffuser shell form a passage for combustion gas during actuation.

When the housing is deformed during actuation, the protruding portion of the cylindrical wall surface of the retainer is abutted against the top plate of the diffuser shell and therefore a hole formed by the top plate and the depression serve as a passage for combustion gas.

Subsequent movement of the retainer is thus inhibited at the protrusion, and the filter is prevented from being excessively compressed. Further, the gas passage in the depression is not closed.

The invention 3, being preferable, provides the gas generator of invention 1 or 2, wherein inside the housing, a cylindrical member is disposed by press-fitting into the lower circumferential wall plate of the closure shell such that a gap is formed between the cylindrical member and the top plate of the diffuser shell, and between the cylindrical member and the gas discharge port formed in the upper circumferential wall plate; and the retainer is press-fitted and fixed to the cylindrical member.

The cylindrical member is used when the retainer is indirectly press-fitted into the circumferential wall plate.

Since the cylindrical member is fixed by press-fitting, and the retainer is fixed to the cylindrical member by press-fitting, the attachment thereof is easy to perform. This manner is compatible with changes in an amount of the gas generating agent and in the filter thickness.

Further, by using the cylindrical member, a gas passage from the filter to the gas discharge port is secured and also, advantageous effects are also obtained in collecting combustion residues and cooling the combustion gas by colliding with the wall surface of the cylindrical member.

In invention 4, being preferable, the step portion is formed at the circumferential wall plate of the housing. The step portion is formed such that an inner diameter of the upper circumferential wall plate in the potion where the gas discharge port is provided in the diffuser shell is made less than the inner diameter of the remaining portion of the upper circumferential wall plate. In other words, a reduced diameter portion is formed in the side of the top plate of the diffuser shell, and the gas discharge port is formed in the reduced diameter portion.

The retainer has a bottom surface.

The retainer is press-fitted and fixed to the upper circumferential wall plate in the side of the bottom plate of the closure shell, under the step portion, and supports the filter by at least the bottom surface. In this case, the gas discharge port is formed in the side of the top plate of the diffuser shell (in the reduced diameter portion), above the step portion.

During activation when the housing is deformed in both of the directions of the top plate of the diffuser shell and the bottom plate of the closure shell, movement of the retainer is blocked by the circumferential edge of the retainer abutting against the step portion. As a result, the gas discharge port is not closed, the filter is prevented from being excessively compressed, and the passage for combustion gas is ensured.

Further, when the retainer is in contact with the step portion and prevented from moving, the filter is in close contact with the top plate of the diffuser shell. Therefore, the short-passing of the combustion gas is prevented.

The invention 5, being preferable, provides
the gas generator of any of inventions 1 to 3, wherein
the filter and the retainer are in an annular shape, a lower surface of the filter is supported by an annular bottom surface of the retainer, and an outer circumferential surface of the filter is supported by the cylindrical wall surface of the retainer, and
the retainer has a through-hole serving as a gas passage on a side of the inner circumferential edge of the annular bottom surface which faces the filter.

By forming a through-hole serving as a gas passage in the side of the inner circumferential edge of the annular bottom surface of the retainer, the combustion gas passes through the annular bottom surface of the retainer in addition to the inner circumferential surface of the filter.

When the through-hole is formed in the side of the inner circumferential edge of the annular bottom surface of the retainer, the through-hole is preferably formed at the side of the inner circumferential edge in a zone equal to or less than ½, more preferably equal to or less than ⅓ of the retainer width.

The invention 6, being preferable, provides the gas generator of any of inventions 1 to 3, wherein
the retainer is in an annular shape;
the filter is in an annular shape having an outer circumferential surface, an annular top surface, and an annular tilted surface, and has a substantially triangular shape, in a cross section thereof in a thickness direction, the smallest thickness of the filter being in a side of the central axis of the housing, and
only part of the annular tilted surface of the filter in a side of the outer circumferential surface is supported by the bottom surface of the retainer, and the outer circumferential surface of the filter is supported by the cylindrical wall surface of the retainer.

With a filter in the above shape, the thickness in the side of the inner circumferential edge is less than that in the side of the outer circumferential edge. Since the surface area of the filter exposed in the combustion chamber is further increased, the filter function is improved. Further, by providing the filter with the above shape, the filter in the side of the inner circumferential edge is deformed easily.

The invention 7, being preferable, provides the gas generator of any of inventions 1 to 6, wherein the filter and the retainer are in an annular shape and the inner circumferential surface of the filter is arranged to protrude toward the central axis of the housing. It is more preferable that the inner circumferential surface of the filter is arranged to protrude inside a central hole formed in the annular bottom surface of the retainer, toward the central axis of the housing.

With such an arrangement of the filter, during activation, a portion of the filter protruding from the inner circumferential edge of the central hole in the retainer serves as an flow inlet of the combustion gas, rather than a Portion supported by the retainer.

The inflow of gas into the filter is limited because the cup-shaped container is opposite to the inner circumferential edge of the filter. However, with the above arrangement, a smooth inflow of gas into the filter is ensured.

In the gas generator of the present inventions, an inner structure and an assembling process are simplified and short-passing of combustion gas is prevented even when the housing is deformed under pressure during actuation.

Figure 1:
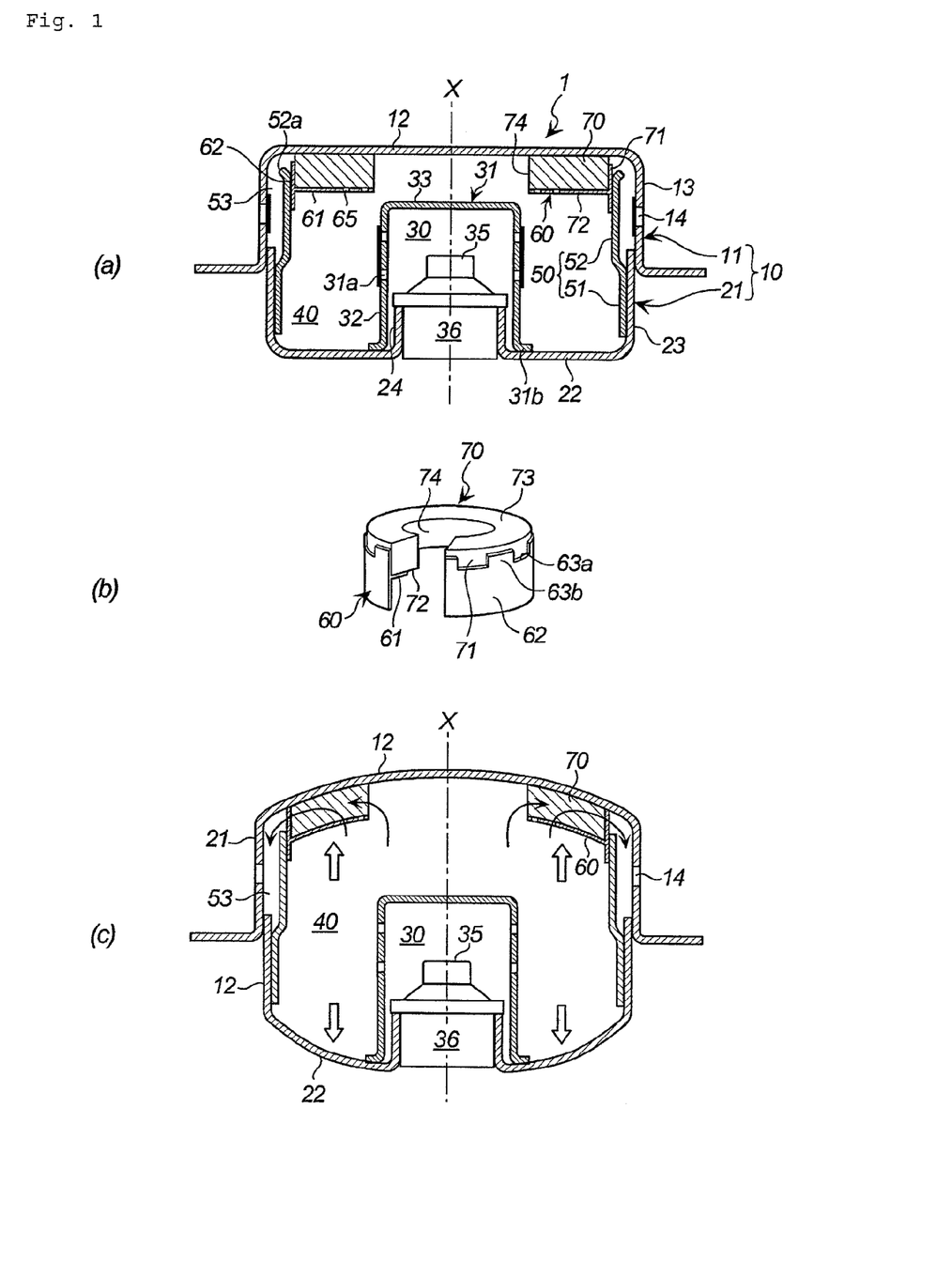

Embodiments of Invention (1) Gas Generator Shown in FIG. 1

An embodiment of a gas generator 1 in accordance with the present invention will be explained below with reference to (a) to (c) in FIG. 1.

A housing 10 is formed by integrating a diffuser shell 11 and a closure shell 21 by welding.

As shown in (a) in FIG. 1, the closure shell 21 is press-fitted into an opening of the diffuser shell 11, so that a contact portion thereof is joined and integrated.

The diffuser shell 11 has a top plate 12 and an upper circumferential wall plate 13 formed with a gas discharge port 14.

The closure shell 21 has a bottom plate 22 and a lower circumferential wall plate 23.

The circumferential wall plate of the housing 10 is formed by the upper circumferential wall plate 13 and the lower circumferential wall plate 23. The joining is performed only at the upper circumferential wall plate 13 and the lower circumferential wall plate 23.

In the housing 10, an ignition device chamber 30 in which an ignition device is housed in a cup-shaped container 31 is disposed in the central portion of the closure shell bottom plate 22.

A known transfer charge or gas generating agent (not shown in the drawing) is accommodated inside the ignition device chamber 30, and a plurality of flame transferring holes 31a are formed in a circumferential wall 32 of the cup-shaped container 31. The flame transferring holes 31a are closed from the outside with a metallic seal tape.

A flange portion 31b is formed at the opening of the cup-shaped container 31, and the flange portion 31b is fixed by welding to the closure shell bottom plate 22.

The ignition device includes an electric igniter 35 and a collar 36 enclosing the igniter. The ignition device is inserted from the opening formed in the central part of the bottom plate of the closure shell 22.

In the ignition device, the collar 36 is supported by and fixed to a tubular support wall portion 24 formed by bending the closure shell bottom plate 22 so as to form an opening in the central part.

A cylindrical member 50 is disposed inside the housing 10. The cylindrical member 50 is in a shape such that an outer diameter of a lower cylindrical wall portion 51 on the lower end side (in the side of the closure shell bottom plate 22) is larger than the outer diameter of an upper cylindrical wall portion 52 on the upper end side (in the side of the diffuser shell top plate 12).

A circumferential edge 52a of an opening of the upper cylindrical wall portion 52 of the cylindrical member 50 is shaped to expand outward so that a retainer 60 is easily press-fitted therein.

In the cylindrical member 50, the lower cylindrical wall portion 51 is press-fitted into the lower circumferential wall plate 23 of the closure shell 21, and the circumferential edge 52a of the opening of the upper cylindrical wall portion 52 is fixed so that a gap, serving as a gas passage, is formed between the circumferential edge 52a and the diffuser shell top plate 12. This gap serving as the gas passage is in an annular shape, or a comb-like shape such that the circumferential edge 52a of the opening includes a first portion abutting against the top plate 12 of the diffuser shell and a second portion that does not abut thereagainst. The first portion and the second portion are formed at predetermined intervals.

A cylindrical space 53 is formed between the outer circumferential wall of the upper cylindrical wall portion 52 having a smaller outer diameter and the upper circumferential wall plate 13 including the gas discharge port 14.

A combustion chamber 40 is formed outside the ignition device chamber 30 and inside the cylindrical member 50, and a gas generating agent (not shown in the drawing) is loaded into the combustion chamber.

For example, a gas generating agent with a low combustion temperature (for combustion chamber 40) and a gas generating agent with a high combustion temperature (for the ignition device chamber 30), such as disclosed in JP-A No. 2005-199867, can be used in the combustion chamber 40 and the ignition device chamber 30, respectively.

An annular filter 70 supported by the retainer 60 is disposed inside the housing 10.

The annular filter 70 is disposed between the bottom surface 33 of the cup-shaped container 31 and the top Plate 12 of the diffuser shell to abut against the top plate 12.

The retainer 60 has an annular bottom surface 61 and a cylindrical wall surface 62 that is provided vertically, extending from the outer circumferential edge of the annular bottom surface 61 in both directions toward the top plate 12 of the diffuser shell and the bottom plate 22 of the closure shell.

The retainer 60 is fixed by press-fitting the cylindrical wall surface 62 into the upper cylindrical wall portion 52 of the cylindrical member 50.

A depression-protrusion configuration including depressions 63a and protrusions 63b arranged alternately in the circumferential direction is formed at the circumferential edge of the cylindrical wall surface 62 in the side of the top plate 12 of the diffuser shell.

A plurality of through-holes 65 serving as passage ports for combustion gas are formed in the annular bottom surface 61 closer to the axis X (within a range of ⅓ of the width of the annular bottom surface 61 in the side of the axis X).

The filter 70 is in an annular shape, and the inner diameter thereof is about equal to or somewhat larger than the outer diameter of the cup-shaped container 31.

In the filter 70, an outer circumferential surface 71 and a lower surface 72 are supported by the cylindrical wall surface 62 and the annular bottom surface 61 of the retainer, respectively.

Before the gas generator is actuated, the upper surface 73 of the filter 70 protrudes upward beyond the retainer protrusions 63b, as shown in (b) in FIG. 1.

An example of the method for assembling the gas generator 1 will be explained below.

The lower cylindrical wall portion 51 of the cylindrical member 50 is press-fitted and fixed to the lower circumferential wall plate 23 of the closure shell 21 having the ignition device fixed thereto.

A predetermined amount of the gas generating agent is loaded (first loading).

The retainer 60 is fixed by press-fitting from the upper cylindrical wall portion 52 (the circumferential edge 52a of the opening) of the cylindrical member 50.

The annular filter 70 is inserted into the retainer 60.

The gas generating agent is loaded into the space defined by the bottom surface of the cup-shaped container 31 and the central opening of the annular filter 70 (second loading). In some cases, the second loading is omitted.

After the diffuser shell 11 and the closure shell 21 are assembled, the contact portion is fixed by welding.

The operation of the gas generator 1 will be explained below.

When the igniter 35 is actuated, the gas generating agent located in the ignition device chamber 30 is ignited and burned, and the combustion gas is generated and released from the flame transferring holes 31a into the combustion chamber 40.

When the gas generating agent located inside the combustion chamber 40 is thereby ignited and burned and combustion gas is generated, the internal pressure applies in both directions along the axis X, as shown by the white arrows in (c) in FIG. 1. As a result, the housing 10 is deformed in such directions that the top plate 12 and the bottom plate 22 are away from each other. As a result, the housing 10 is deformed in such a direction that the top plate 12 and the bottom plate 22 are away from each other.

Since the housing 10 is formed by welding only the openings of the diffuser shell 11 and the closure shell 21, the top plate 12 undergoes the largest deformation in the axis X portion (in the central part).

Further, since the cup-shaped container 31 is fixed to the bottom plate 22 by welding, the bottom surface 33 thereof moves in the direction of separation away from the top plate 12.

Under the pressure in the combustion chamber 40, the bottom surface 61 of the retainer is deformed while pressing the lower surface 72 of the filter. Therefore, short-passing between the retainer 60 and the filter 70 is prevented.

Meanwhile, the cylindrical wall surface 62 of the retainer collides with the top plate 12, but only the protrusions 63b collide in this case, and a subsequent movement is blocked. Therefore, a combustion gas passage formed by the depressions 63a are ensured between the cylindrical wall surface 62 of the retainer and the top plate 12.

Further, since the filter 70 is deformed while being pressed against the top plate 12, short-passing for the combustion gas between the top plate 12 and the upper surface 73 of the filter is also prevented.

Since the inner circumferential surface 74 of the filter 70 is exposed and the annular bottom surface 61 of the retainer has a through-hole 65, the combustion gas passes through the entire region of the filter 70 in a flow such as shown by the arrows in (c) in FIG. 1.

The combustion gas is discharged from the gas discharge port 14 after passing through the cylindrical space 53 formed between the circumferential wall plate of the housing and the cylindrical member 50. In this process, the combustion gas collides with the cylindrical member 50 or the upper circumferential wall plate 13, thereby increasing the effect of trapping the combustion residues or the gas cooling effect. Therefore, this is also effective in terms of downsizing the filter 70.

Figure 2:
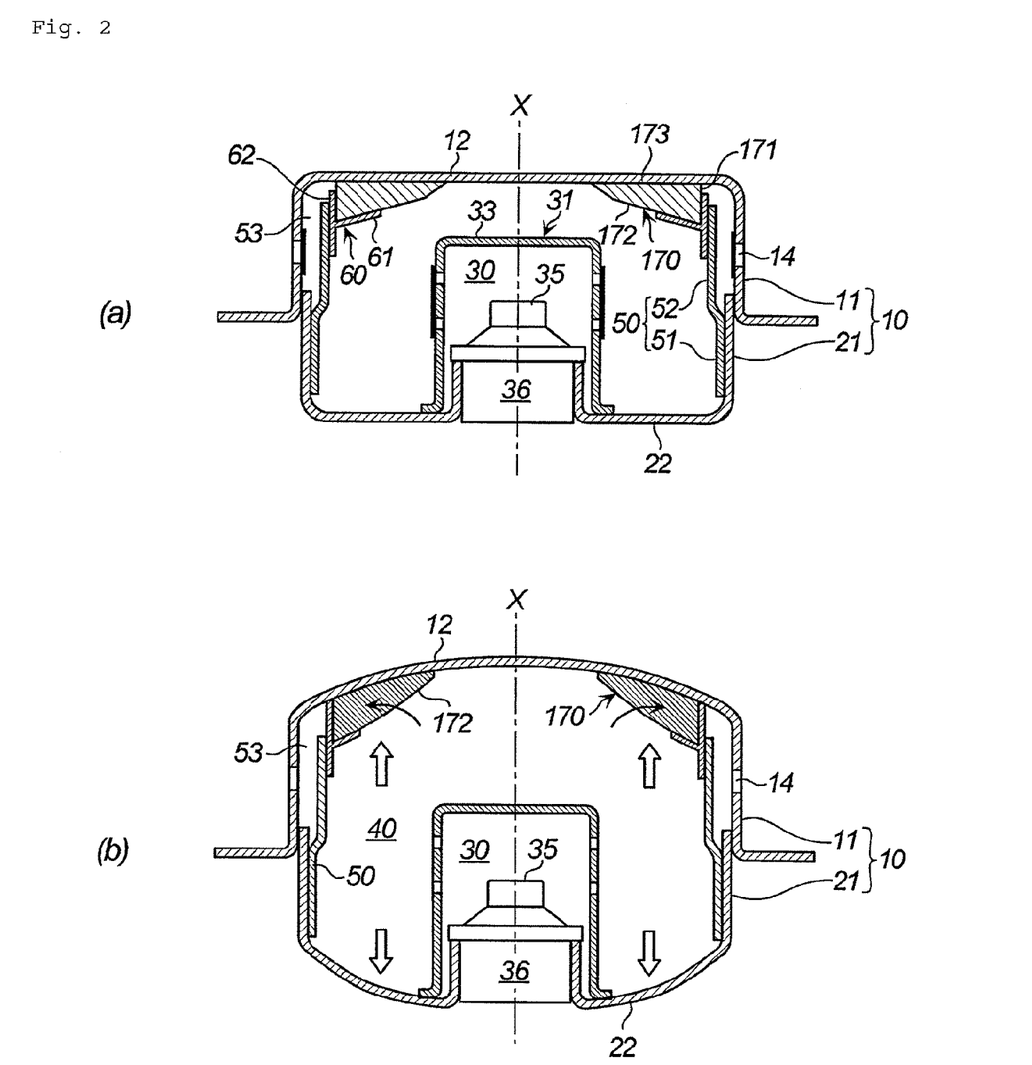

(2) Gas generator shown in FIG. 2

The gas generator shown in (a) in FIG. 2 is substantially identical to the gas generator shown in (a) in FIG. 1, except that the shape of the filter is different.

A filter 170 is in an annular shape, having an outer circumferential surface 171, an annular top surface 173, and an annular tilted surface 172.

When viewed in the cross section in the thickness direction, the filter 170 is in a substantially triangular shape including the outer circumferential surface 171, the annular top surface 173, and the annular tilted surface 172 and having the smallest thickness in the side of the axis X (on the side of the center).

The retainer 60 is substantially identical to that shown in (a) and (b) in FIG. 1, except that the annular bottom surface 61 extends obliquely upward with respect to the cylindrical wall surface 62 in accordance with the shape of the filter 170.

In the filter 170, a portion of the annular tilted surface 172 close to the outer circumferential surface 171 is supported by the annular bottom surface 61 of the retainer 60, and the outer circumferential surface 171 is supported by the cylindrical wall surface 62.

In the cross-sectional view shown in (a) in FIG. 2, the length over which the annular bottom surface 61 supports the annular tilted surface 172 is about ⅓ of the length of the annular tilted surface 172 and the remaining section is exposed inside the combustion chamber 40.

The gas generator shown in (a) in FIG. 2 is assembled in the same manner as the gas generator shown in (a) in FIG. 1.

The operation of the gas generator shown in (a) in FIG. 2 is substantially identical to that of the gas generator shown in (a) in FIG. 1. The difference in operation caused by the filter 170 in a different shape will be explained below.

During the actuation, the gas generator shown in (a) in FIG. 2 is deformed as shown in (b) in FIG. 2. In this case, as shown in the drawing, the contact area in the filter 170 with the combustion gas is larger than that in the filter 70 shown in FIG. 1. Therefore, an amount of gas that flows into the filter 170 also increases. In particular, a thickness in the side of the inner circumferential edge is smaller, the gas then smoothly flows into the filter, and the filtering efficiency also increases. Further, since the combustion gas flows more easily into the filter 170, cooling efficiency is increased.

Short-passing in the gas generator shown in FIG. 2 is prevented in the same manner as in the gas generator shown in FIG. 1

Figure 3:
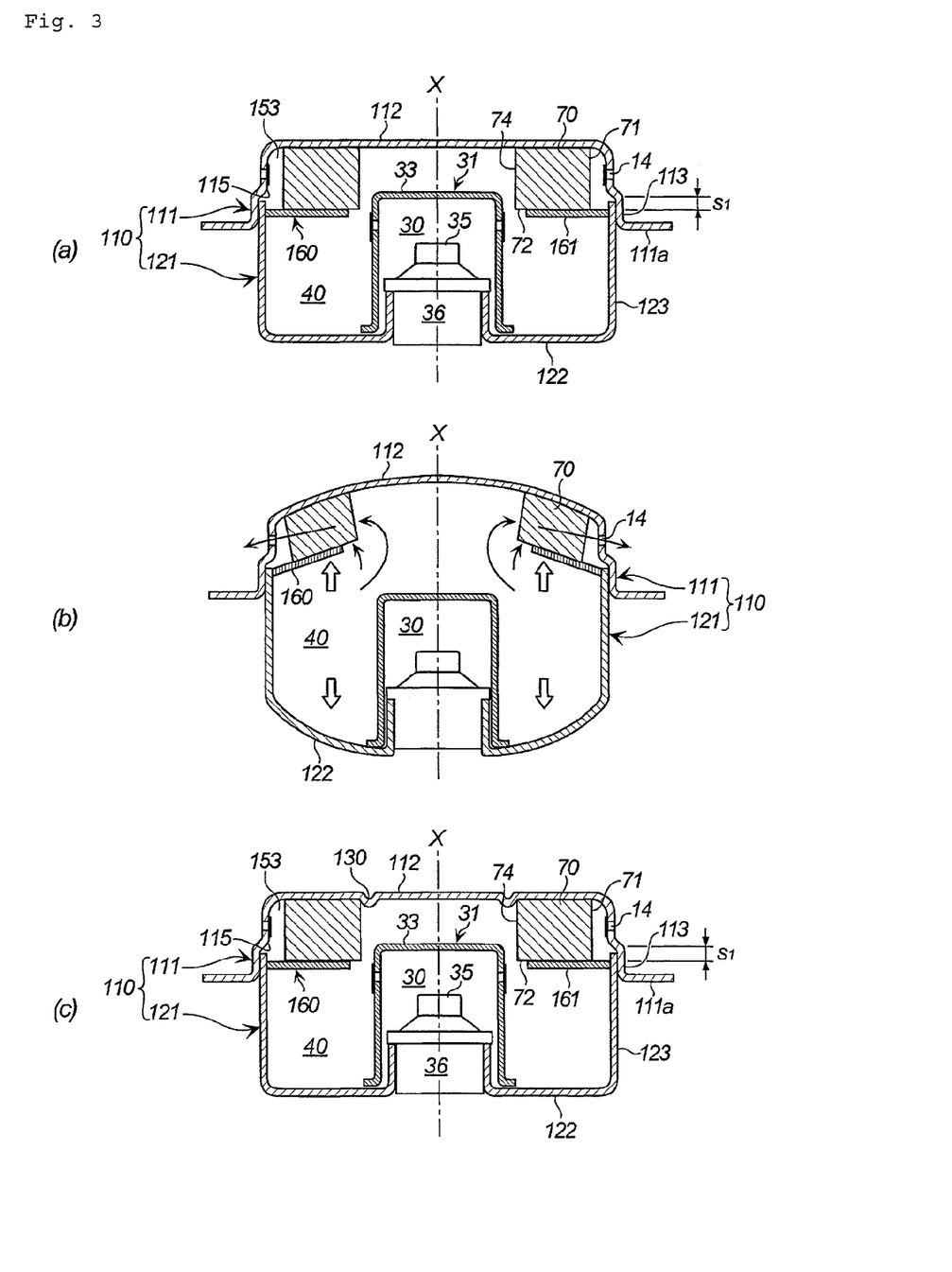

(3) Gas generator shown in FIG. 3

The gas generator shown in (a) in FIG. 3 is substantially identical to the gas generator shown in (a) in FIG. 1, except that the shape of the housing and the shape of the retainer supporting the filter are different. Therefore, the explanation below is focused on the different portions.

In a housing 110, the length of an upper circumferential wall plate 113 of a diffuser shell 111 is less than that of a lower circumferential wall plate 123 of a closure shell 121.

The gas discharge port 14 is formed in the upper circumferential wall plate 113 at a position close to a top plate 112 of the diffuser shell.

A step portion 115 is formed in the upper circumferential wall plate 113 (in the side of the bottom plate 122 of the closure shell), under the gas discharge port 14.

The inner diameter of the diffuser shell 111 in the side of the top plate 112 is less than the inner diameter thereof in the bottom plate 122 side, with the step portion 115 serving as a boundary. Further, a reduced diameter portion is formed in the top plate 112 side, and the gas discharge port 14 is disposed in the reduced diameter portion. A flange portion 111a extends radially outward from the lower end of the upper circumferential wall plate 113. An enlarged diameter portion with increased inner diameter is present between the flange portion 111a and the step portion 115.

The closure shell includes the bottom plate 122 and the lower circumferential wall plate 123, and the lower circumferential wall plate 123 has a constant outer diameter. The upper end thereof is press-fitted into the enlarged diameter portion formed in the upper circumferential wall plate 113 of the diffuser shell 111 and fixed by a method such as welding.

A bottom surface 161 of the retainer 160 is formed in an annular shape, and the retainer is fixed by press-fitting the outer circumferential edge thereof against the lower circumferential wall plate 123 of the closure shell 121. A space (s1) is present between the step portion 115 and the bottom surface 161.

An annular filter same as that shown in (a) in FIG. 1 is used as the filter 70, and the filter is disposed in a state in which the inner circumferential surface 74 of the filter protrudes beyond the bottom surface 161 of the retainer toward the axis X (center) (state in which the inner circumferential surface of the filter protrudes further inward from the inner circumferential edge of the retainer 160).

A cylindrical space 153 is formed between the diffuser shell 111 and the outer circumferential surface 71 of the filter.

The gas generator shown in (a) in FIG. 3 is assembled in the same manner as the gas generator shown in (a) in FIG. 1. However, since the retainer 160 shown in (a) in FIG. 3 has no cylindrical wall surface such as that of the retainer 60 shown in FIG. 1 and FIG. 2, a depression (a plurality of independent depressions or an annular depression) 130 for positioning the filter are formed in the top plate 112, as shown in FIG. 3(c), to facilitate the positioning of the filter 70.

The operation of the gas generator shown in (a) in FIG. 3 is similar to that of the gas generator shown in (a) in FIG. 1, and the difference in operation caused by the difference in shapes of the housing 110 and the retainer 160 will be explained below.

Upon receiving the pressure created by actuation, the gas generator shown in (a) in FIG. 3 is deformed as shown in (b) in FIG. 3.

In this case, the retainer 160 moves towards the top plate 112, but is prevented from moving further by colliding with the step portion 115.

Since the square cross-sectional shape (shown in (a) in FIG. 3) of the filter 70 changes to that close to a parallelogram, the gas inflow surface area in the filter is increased and the travel distance of the gas inside the filter also increases. Therefore, the filtration performance is improved.

The inner surface of the enlarged diameter portion of the housing 10 has a wide range for press-fitting the retainer 160, and the position thereof is changed according to the thickness of the filter 70 used or a loaded amount of the gas generating agent disposed in the combustion chamber 40.

Therefore, it is not necessary to replace the parts for each specification and the same parts are used.

Further, due to the presence of means (the step portion 115) for preventing the retainer 160 from moving further than a predetermined distance when the gas generator is actuated, the output performance during actuation does not change.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator, comprising:
a diffuser shell having a top plate and an upper circumferential wall plate provided with a gas discharge port,
a closure shell having a bottom plate and a lower circumferential wall plate,
a housing forming an outer shell and being obtained by joining and integrating the upper circumferential wall plate and the lower circumferential wall plate,
inside the housing,
an ignition device chamber defined by a cup-shaped container, which is positioned at a central part of the bottom plate of the closure shell, and accommodating an ignition device therein,
a combustion chamber formed to enclose the ignition device chamber and being loaded with a gas generating agent, an annular or flat plate-shaped filter disposed to face the top plate, a retainer supporting the filter, the retainer including a bottom surface and a cylindrical wall surface extending from an outer circumferential edge of the bottom surface at least towards the top plate of the diffuser shell, the cylindrical wall surface having a combustion gas passage, the retainer supporting at least part of an outer circumferential surface and a lower surface of the filter by the bottom surface and the cylindrical wall surface, respectively, the retainer being fixed by directly or indirectly press-fitting the cylindrical wall surface to a circumferential wall plate which is formed by the upper circumferential wall plate and the lower circumferential wall plate, during actuation, when the housing is deformed in both directions of the top plate of the diffuser shell and the bottom plate of the closure shell, and the retainer and the filter move into attachment to the top plate of the diffuser shell, combustion gas passing through the filter, then passing through the combustion gas passage in the cylindrical wall surface of the retainer and being discharged from the gas discharge port.

2. A gas generator according to claim 1, wherein the retainer has a depression and a protrusion in the circumferential direction thereof at a circumferential edge of the cylindrical wall surface in a side of the top plate of the diffuser shell, and when the housing is deformed both in the direction of the top plate and in the direction of the bottom plate and both the retainer and the filter move towards the top plate of the diffuser shell during actuation, the protrusion of the cylindrical wall surface of the retainer is abutted against the top plate of the diffuser shell, and the depression of the cylindrical wall surface of the retainer forms the combustion gas passage.

3. A gas generator according to claim 1, wherein inside the housing, a cylindrical member is disposed by press-fitting into the lower circumferential wall plate of the closure shell such that a gap is formed between the cylindrical member and the top plate of the diffuser shell, and between the cylindrical member and the gas discharge port formed in the upper circumferential wall plate; and the retainer is press-fitted and fixed to the cylindrical member.

4. A gas generator, comprising:

a diffuser shell having a top plate and an upper circumferential wall plate provided with a gas discharge port, a closure shell having a bottom plate and a lower circumferential wall plate, a housing forming an outer shell and being obtained by joining and integrating the upper circumferential wall plate and the lower circumferential wall plate and including a circumferential wall plate, the housing having a step portion formed in the upper circumferential wall plate, an inner diameter of a portion in the upper circumferential wall plate, which is provided with a gas discharge port in the diffuser shell being made less than an inner diameter of the remaining portion of the upper circumferential wall plate by the step portion, inside the housing, an ignition device chamber defined by a cup-shaped container, which is positioned at a central part of the bottom plate of the closure shell, and accommodating an ignition device therein a combustion chamber formed to enclose the ignition device chamber and being loaded with a gas generating agent, an annular or flat plate-shaped filter disposed to face the top plate, a retainer supporting the filter, the retainer including a bottom surface which supports at least part of a lower surface of the filter, the retainer being fixed at a circumferential edge thereof by press-fitting into an inner circumferential surface of the circumferential wall plate with a gap provided at the step portion, during activation when the housing is deformed in both directions of the top plate of the diffuser shell and the bottom plate of the closure shell, and when movement of the retainer is blocked by the circumferential edge of the retainer abutting against the step portion, the filter being in close contact with the top plate of the diffuser shell, combustion gas passing through the filter and being discharged from the gas discharge port.

5. A gas generator according to claim 1, wherein the filter and the retainer are in an annular shape, a lower surface of the filter is supported by an annular bottom surface of the retainer, and an outer circumferential surface of the filter is supported by the cylindrical wall surface of the retainer, and the retainer has a through-hole serving as a gas passage on a side of the inner circumferential edge of the annular bottom surface which faces the filter.

6. A gas generator according to claim 1, wherein the retainer is in an annular shape;

the filter is in an annular shape having an outer circumferential surface, an annular top surface, and an annular tilted surface, and has a substantially triangular shape, in a cross section thereof in a thickness direction, the smallest thickness of the filter being in a side of the central axis of the housing, and only part of the annular tilted surface of the filter in a side of the outer circumferential surface is supported by the bottom surface of the retainer, and the outer circumferential surface of the filter is supported by the cylindrical wall surface of the retainer.

7. A gas generator according to claim 1, wherein the filter and the retainer are in an annular shape, and an inner circumferential surface of the filter is arranged to protrude toward a central axis of the housing.

* * * * *